(12) United States Patent
Padhye et al.

(10) Patent No.: US 9,277,004 B2
(45) Date of Patent: Mar. 1, 2016

(54) PREDICTION OF NETWORK PATH QUALITY AMONG PEER NETWORKING DEVICES

(75) Inventors: Jitendra D. Padhye, Redmond, WA (US); Sharad Agarwal, Seattle, WA (US); Christopher Charles John Butcher, Seattle, WA (US); Youngki Lee, Daejeon (KR)

(73) Assignee: Microsoft Technology Licensing, LLC, Redmond, WA (US)

( * ) Notice: Subject to any disclaimer, the term of this patent is extended or adjusted under 35 U.S.C. 154(b) by 1232 days.

(21) Appl. No.: 12/033,250

(22) Filed: Feb. 19, 2008

(65) Prior Publication Data

US 2009/0209349 A1 Aug. 20, 2009

(51) Int. Cl.
*H04L 29/08* (2006.01)

(52) U.S. Cl.
CPC .......... *H04L 67/101* (2013.01); *H04L 67/1002* (2013.01); *H04L 67/1021* (2013.01); *H04L 67/1063* (2013.01); *H04L 67/1072* (2013.01); *H04L 67/1023* (2013.01)

(58) Field of Classification Search
CPC ..... H04L 41/50–41/508; H04L 47/80–47/808; H04L 65/80; H04L 67/10–67/1097
USPC .................. 709/204–207, 223–229, 238–244
See application file for complete search history.

(56) References Cited

U.S. PATENT DOCUMENTS

| | | | |
|---|---|---|---|
| 5,894,556 A | 4/1999 | Grimm et al. | |
| 6,023,729 A | 2/2000 | Samuel et al. | |
| 6,304,902 B1 | 10/2001 | Black et al. | |
| 6,665,271 B1 | 12/2003 | Thomas et al. | |
| 7,097,562 B2 | 8/2006 | Gagner | |
| 7,133,368 B2 | 11/2006 | Zhang et al. | |
| 7,133,927 B2 | 11/2006 | Guo et al. | |
| 2004/0215756 A1* | 10/2004 | VanAntwerp et al. | 709/223 |
| 2005/0071481 A1* | 3/2005 | Danieli | 709/229 |
| 2005/0198328 A1* | 9/2005 | Lee et al. | 709/229 |
| 2006/0209701 A1* | 9/2006 | Zhang et al. | 370/249 |
| 2007/0265067 A1* | 11/2007 | Jiao et al. | 463/29 |
| 2008/0031136 A1* | 2/2008 | Gavette et al. | 370/235 |
| 2008/0104231 A1* | 5/2008 | Dey et al. | 709/224 |

OTHER PUBLICATIONS

Sebastian Zander, et al. Empirically Measuring the QoS Sensitivity of Interactive Online Game Players. Australian Telecommunications Networks & Applications Conference 2004 (ATNAC2004), Sydney, Australia, Dec. 8-10, 2004, ISBN 0-646-44190-6. http://caia.swin.edu.au/pubs/ATNAC04/zander-armitage-ATNAC2004.pdf. Last accessed Nov. 20, 2007, 8 pages.

(Continued)

*Primary Examiner* — Linglan Edwards
*Assistant Examiner* — Kevin Bechtel
(74) *Attorney, Agent, or Firm* — Alin Corie; Sandy Swain; Micky Minhas

(57) ABSTRACT

The claimed subject matter provides a system and/or a method that facilitates connectivity within a peer-to-peer networking environment. A client can transmit a request to connect with a host for peer-to-peer networking. A server can generate a list that includes at least one host that matches the request from the client. A predictor engine can reduce the list by at least one matched host based upon a predictor, wherein the predictor is at least one of an Internet Protocol history predictor, a prefix history predictor, or a geography predictor.

18 Claims, 10 Drawing Sheets

(56) References Cited

OTHER PUBLICATIONS

OPScore, or Online Playability Score: A Metric for Playability of Online Games with Network Impairments. Prepared by Ubicom Inc. Mar. 2005. IP3K-DWP-OPSCORE-10 http://www.ubicom.com/pdfs/whitepapers/IP3K-DWP-OPSCORE-10.pdf. Last accessed Nov. 20, 2007, 14 pages.

Mark Allman, et al. On Estimating End-to-End Network Path Properties http://www.sigcomm.org/sigcomm-la/allman-combo.pdf. Last accessed Nov. 20, 2007, 28 pages.

Mark Claypool. Network Characteristics for Server Selection in Online Games. ftp://ftp.cs.wpi.edu/pub/techreports/pdf/07-02.pdf. Last accessed Nov. 20, 2007, 12 pages.

* cited by examiner

PREDICTION OF NETWORK PATH QUALITY AMONG PEER NETWORKING DEVICES

BACKGROUND

Technological advances in computer hardware, software and networking have lead to increased demand for electronic information exchange rather than through conventional techniques such as paper correspondence, for example. Such electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

In particular, modern game-play devices have developed capabilities of powerful computers as integrated circuit technology has become more advanced and incorporated into such game-play devices. Where traditional game-play devices ran exclusively on removable media, such as floppy discs, compact discs (CDs), digital video discs (DVDs), etc., and interaction with such games was solely by way of a joystick or other game control device, modern game-play systems are not so limited. Rather, a modern device can utilize powerful network and computing applications such as e-mail, instant messaging, web browsing, digital video recording, and the like. Additionally, gaming has progressed to an online arena, where players can synchronize their gaming systems with other players via an online server, and communicate, coordinate, and interface with other remote players while playing a game.

Within such online arenas, network connectivity falls into either a client-server architecture (e.g., users communicate with a large, well-provisioned dedicated server) or a peer-to-peer (P2P) architecture (e.g., users communicate with each other directly or via a peer). Peer-to-peer architectures and networking environments have grown considerably in population and use. In a peer-to-peer environment, many applications require the selection of another peer in the network that can provide services via a network connection, such as serving as the central coordinator for a multiplayer game. In these situations we refer to the peer that is searching for services as a "client" and a potential peer that can provide these services as a "host." Additionally, in a peer-to-peer network there can be particular services, such as multiplayer game play, in which one or more "clients" connect to each other via a "host" intermediary, where both host and client are peers rather than a dedicated well-provisioned centrally located server. An individual peer might act as both a "host" and a "client" for different connections. In particular, effective selection or matchmaking of a client to a host based on network path quality (NPQ) can impact connectivity there between. In other words, good network connectivity between a client and a matched host can enable optimal use of a peer-to-peer networking environment.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate identifying a host for a client request to initiate a peer-to-peer connection. A predictor engine can generate estimates related to network path quality (NPQ) and/or round-trip delay time (RTT) in accordance with at least one client and at least one host, wherein the client and the host can initiate peer-to-peer connectivity. NPQ can be any one or combination of attributes such as round trip time (RTT), upstream capacity, downstream capacity, one-way delays, etc. A client can communicate a request for peer-to-peer networking to a server in which hosts can be identified that satisfy such request. For example, the request can be associated with a type of peer-to-peer connection related to online gaming. The predictor engine can reduce the list of hosts based upon estimating whether the peer-to-peer connection is within a particular threshold or tolerance for NPQ and/or RTT. In addition, by estimating the NPQ and/or RTT between a client and a host, the number of probes there between can be lowered to reduce overhead and wait time for peer-to-peer connectivity. A probe can be a technique used to discover NPQ, which may require probing the network path. Moreover, the technique can be independent of any technique used to discover NPQ, of which packet-pair is just a possibility.

The predictor engine can utilize a predictor to estimate whether the NPQ and/or RTT between a client and a server is suitable for initiating a peer-to-peer networking environment. For example, the predictor engine can implement an Internet Protocol (IP) history predictor that predicts NPQ based upon a previous probe between a pair of IP addresses respective to a client and a host. In another example, the predictor engine can utilize a prefix history predictor that estimates NPQ for a pair of IP addresses based upon a previous probe between a client and a host and respective border gateway protocol (BGP) prefixes. In still another example, the predictor engine can estimate NPQ with a geography predictor, wherein the geography predictor can provide the geographic distance between a client and a host which can provide insight on NPQ there between. In other aspects of the claimed subject matter, methods are provided that facilitate probing between hosts and clients (and vice versa) to identify potential peer-to-peer connections with a high network path quality (NPQ).

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
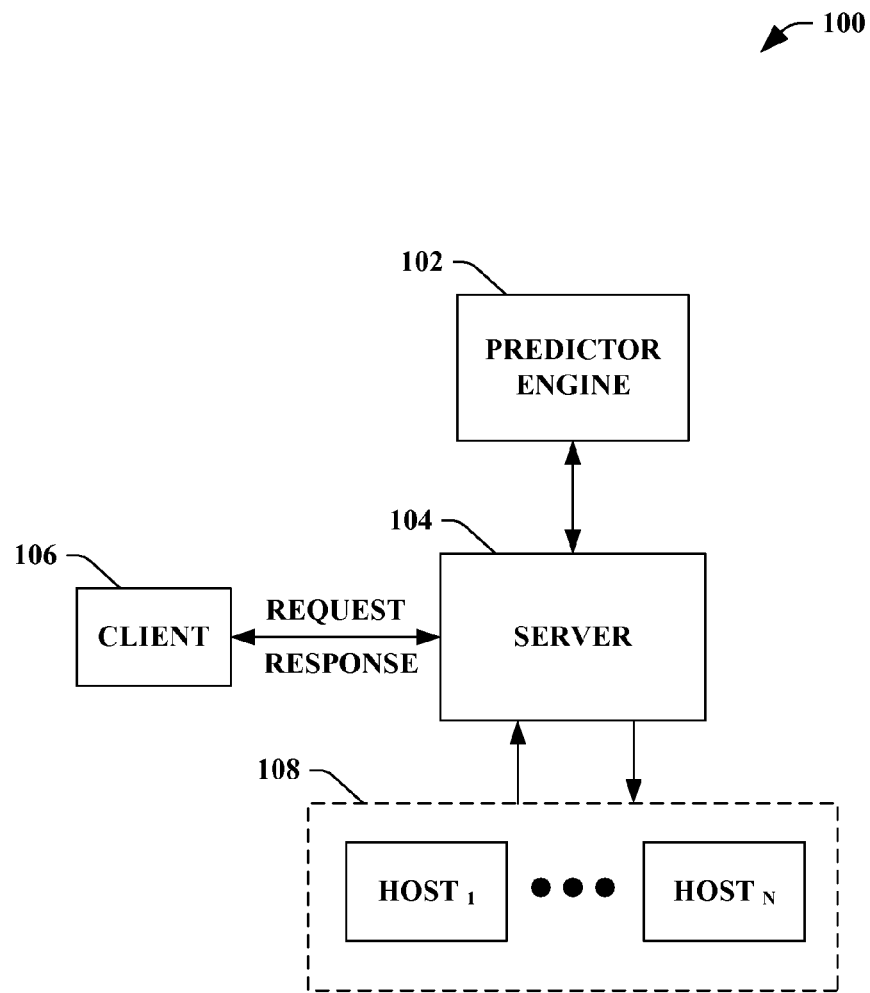
FIG. 1 illustrates a block diagram of an exemplary system that facilitates identifying a host for a client request to initiate a peer-to-peer connection.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "engine," "component," "system," "interface," "client," "server," "device," "console," "store," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates identifying a host for a client request to initiate a peer-to-peer connection. The system 100 can include a predictor engine 102 that can assist in efficiently identifying at least one host 108 for a client 106 by utilizing at least one predictor. The predictor engine 102 can provide accurate matchmaking (e.g., determining which clients should connect to which hosts, etc.) by employing at least one predictor to estimate network path quality (NPQ) via a server 104. It is to be appreciated that NPQ can be any one or combination of attributes such as round trip time (RTT), upstream capacity, downstream capacity, one-way delays, etc. In particular, the predictor engine 102 can implement a predictor to a plurality of hosts 108 to identify an estimated NPQ, wherein such estimated NPQ can be further utilized to perform probing (e.g., a packet pair test from the client to a host and a packet pair test from the host to the client) in connection with the client 106 and at least one host 108. The claimed innovation can utilize any suitable NPQ estimation technique such as, but not limited to, packet pair technique, a packet train, etc. It is to be appreciated that the packet pair test used in probing can be any suitable positive integer, wherein a packet pair can measure bottleneck link capacity. Moreover, it is to be appreciated that there can be any suitable number of hosts, such as $host_1$ to $host_N$, where N is a positive integer. In addition to the predictor engine 102 being depicted as a stand-alone element, it is to be appreciated and understood that the predictor engine 102 can be incorporated into the client 106, the server 104, at least one host 108, a computing device (not shown and discussed in more detail below), and/or any suitable combination thereof.

The client 106 can transmit a request to a server 104 in which the request can include data descriptive of a type of connectivity within a peer-to-peer networking environment. In a specific example, the request can include descriptive data related to an online game type to which the client is attempting to establish a peer-to-peer connection. The online game type can be for a particular game and/or a specific type of game play for the particular game. Moreover, the client 106 can utilize any suitable computing device (not shown) to request and initiate a peer-to-peer connection with a host. For instance, the computing device can be, but is not limited to being, a gaming device, a gaming console, a computer, a laptop, a wireless communication device, a smartphone, a portable digital assistant (PDA), a mobile device, a device capable of connectivity via a peer-to-peer network, a portable gaming device, a machine, etc.

The server 104 can collect and/or identify at least one host 108 based upon the request transmitted from the client 106. For example, the server 104 can aggregate potential hosts 108 that satisfy the request. In a particular example, the hosts collected can be potential hosts for a particular online game type which match the client request. The predictor engine 102 can further enhance matchmaking between the client 106 and at least one host 108 based upon use of a predictor which estimates network path quality (NPQ) between the client 106 and the at least one host 108 in order to reduce the amount of probing. By predicting and/or estimating the NPQ between the client 106 and at least one host 108, the amount of probing is reduced which, in turn, reduces the amount of time to identify a suitable match for the client and also network overhead.

As discussed, the predictor engine 102 can estimate NPQ between the client 106 and at least one host 108 by employing at least one predictor. For example, the predictor engine 102 can utilize a predictor to identify whether a good NPQ is predicted (e.g., limited probing can be performed), a bad NPQ is predicted (e.g., a candidate or host should not be probed) or if no prediction can be made (e.g., utilize standard probing techniques). Furthermore, the predictor engine 102 can leverage at least one of an Internet Protocol (IP) history predictor, a prefix history predictor, or a geography predictor (all of which are discussed in more detail below).

In addition, the system 100 can include any suitable and/or necessary interface component (not shown and herein referred to as "interface"), which provides various adapters, connectors, channels, communication paths, etc. to integrate the predictor engine 102 into virtually any operating and/or database system(s) and/or with one another. In addition, the interface component can provide various adapters, connectors, channels, communication paths, etc., that provide for interaction with the server 104, the client 106, at least one host 108, and any other device and/or component associated with the system 100.

Figure 2:
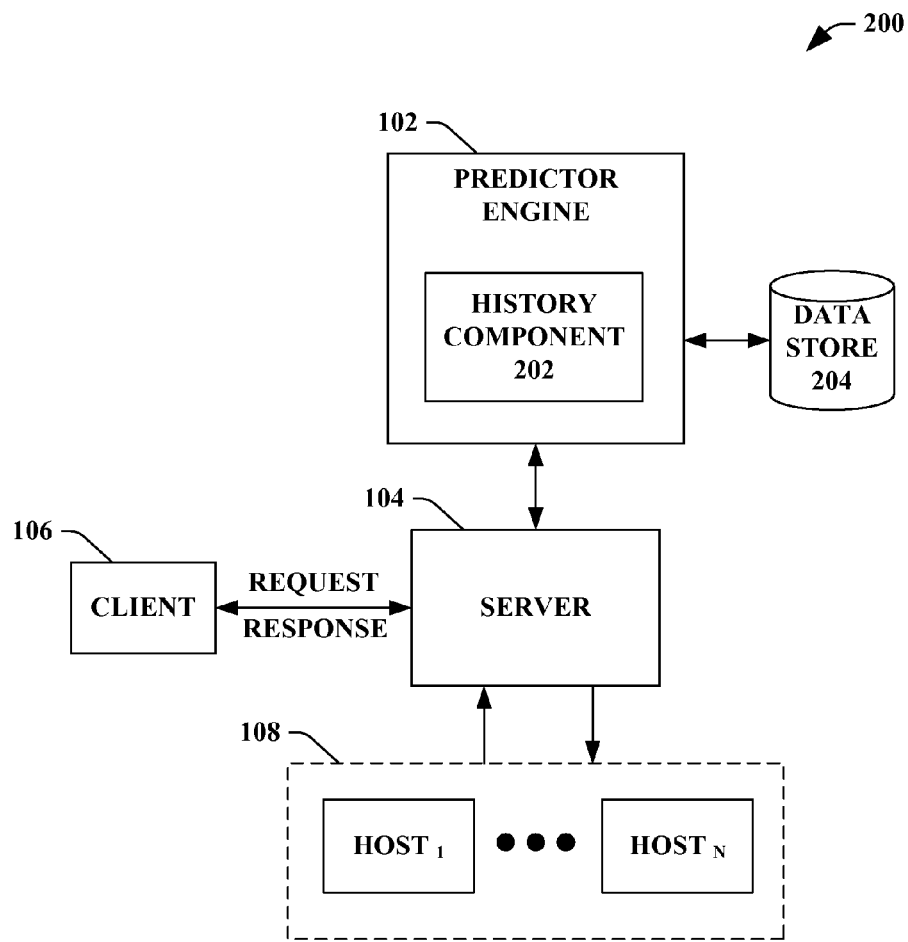
FIG. 2 illustrates a block diagram of an exemplary system that facilitates employing a history predictor related to previous probing of a host to enable optimal peer-to-peer networking.

FIG. 2 illustrates a system 200 that facilitates employing a history predictor related to previous probing of a host to enable optimal peer-to-peer networking. The system 200 can include the predictor engine 102 that can estimate NPQ between the client 106 and at least one host from a plurality of hosts 108 in order to optimally filter available hosts 108 for peer-to-peer connectivity. In general, the client 106 can communicate a request to the server 104, which can be utilized to aggregate potential hosts 108. The predictor engine 102 can further reduce and/or remove potential hosts 108 based upon a predictor that estimates NPQ. Based on this lower number of potential hosts 108, the number of probes between clients and hosts and vice versa can be reduced.

The predictor engine 102 can further include a history component 202 that can track and/or monitor probes between clients and hosts (and vice versa) within a particular time duration (e.g., also referred to as the IP history predictor). In general, the history component 202 can track probes between Internet Protocol (IP) pairs and utilizes such tracked data as an indicator for predictions and/or NPQ estimates. It is to be appreciated that use of the IP history predictor can be limited to a particular time duration in order to increase and/or maintain accuracy of such predicted NPQ. Moreover, it is to be appreciated and understood that the history component 202 can implement the IP history predictor as a component incorporated into the predictor engine 102, incorporated into the client 106, incorporated into the server 104, incorporated into at least one host 108, a stand-alone component, and/or any suitable combination thereof. In other words, the history component 202 can track a history of previous probes that the client 106 and/or at least one host 108 were involved in. Such information can be leveraged before attempting future probes in order to decide which candidate of hosts 108 should be ignored and/or utilized for connectivity.

For example, the history component 202 utilizes the IP history predictor since a probe between a pair (e.g., a client and a host, a first computing device and a second computing device, etc.) at a first time produces an NPQ estimate that is still valid at a later second time. In general, the time duration for the accuracy of the NPQ estimate can be valid for up to any suitable duration calculated or determined. For example, a first experiment or collection of data can indicate a duration period of 20 days, whereas a second experiment or collection of data can indicate a duration period shorter or longer. It is to be appreciated that the IP history predictor can be utilized for probing between a client and a host and probing between a host and a client. Overall, the IP history predictor can predict the NPQ between a pair (e.g., a host and a client participating in a peer-to-peer networking environment) based on an NPQ estimate from a prior probe.

The system 200 can further include a data store 204 that can include any suitable data related to the predictor engine 102, the server 104, the client 106, at least one host 108, a request, the history component 202, etc. For example, the data store 204 can include, but not limited to including, probing history between a client and a host, probing history between a host and a client, probing history between two or more IP address pairs, estimated NPQ for a client and a host, IP history predictor duration settings, prefix history predictor data (discussed in more detail in FIG. 3), geography predictor data (discussed in more detail in FIG. 4), and/or any suitable data related to estimating and/or predicting NPQ between a client and a host within a peer-to-peer networking environment to reduce probing.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, a persistent storage, and the like.

Figure 3:
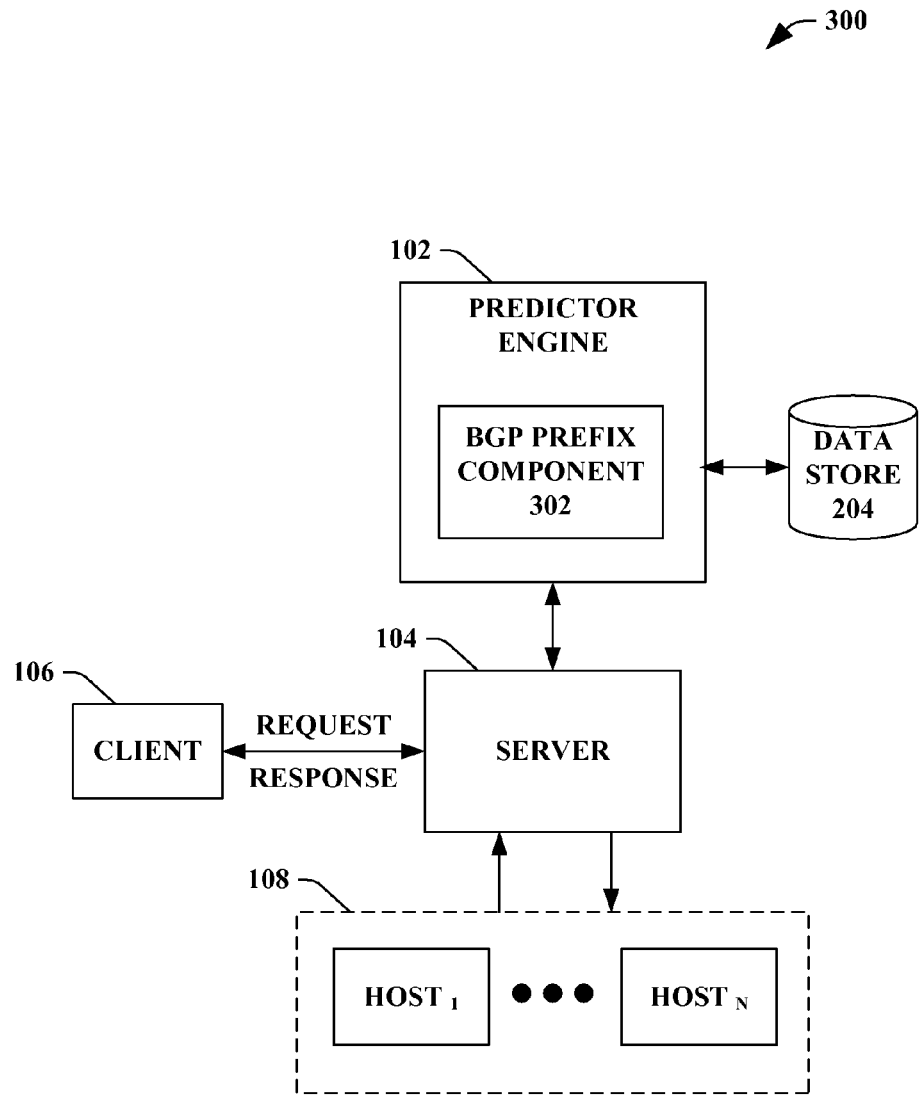
FIG. 3 illustrates a block diagram of an exemplary system that facilitates implementing a predictor to identify a match for a client request while reducing connect time and network overhead.

FIG. 3 illustrates a system 300 that facilitates implementing a predictor to identify a match for a client request while reducing connect time and network overhead. The system 300 can include the predictor engine 102 that can provide estimates of NPQ between at least one server and at least one host. The client 106 can communicate a request to the server 104, wherein the server 104 can identify and/or locate at least one matching (e.g., employing "matchmaking," etc.) host from a plurality of available hosts 108. The request can be, but is not limited to, any suitable data related to defining a portion of peer-to-peer connectivity. In general, the client 106 can be matched to at least one host 108 in which network path quality (NPQ) is suitable (e.g., tolerable latency) for peer-to-peer connectivity. The predictor engine 102 can further implement at least one predictor to estimate NPQ between matched pairs (e.g., host and client) in order to efficiently probe such pairings.

The predictor engine 102 can utilize a border gateway protocol (BGP) prefix component 302. The BGP prefix component 302 can utilize Internet Protocol (IP) prefix pairs to estimate NPQ for at least one client and at least one host. In other words, the BGP prefix component 302 can employ the prefix history predictor. For instance, a probe between a host $A_1$ and a client $B_1$ at a first time can produce an NPQ estimate that is still valid at a second later time for a different pair (e.g., host $A_2$ and client $B_2$) as long as $A_1$ and $A_2$ belong to one BGP prefix and $B_1$ and $B_2$ belong to one BGP prefix. The BGP prefix component 302 can evaluate a matched pair (e.g., a client and a host) in order to identify a BGP prefix, wherein such BGP prefix can be utilized to estimate NPQ. In general, the BGP prefix component 302 can leverage a prior probe between a match pair in the substantially similar pair of prefixes. In one example, the system 300 can utilize the IP history predictor (discussed in FIG. 2) and if a prediction cannot be determined, the BGP prefix component 302 can utilize the prefix history predictor. Moreover, it follows that an increased set of potential data can be utilized for history which can be close to the client and within a substantially similar network. Furthermore, it is to be appreciated and understood that the BGP prefix component 302 can be a component incorporated into the predictor engine 102, incorporated into the client 106, incorporated into the server 104, incorporated into at least one host 108, a stand-alone component, and/or any suitable combination thereof. In another example, the BGP prefix component 302 can utilize an Internet protocol (IP) registrar (e.g., Asia Pacific Network Information Centre (APNIC), American Registry for Internet Numbers (ARIN), Réseaux IP Européens (RIPE), etc.) databases that contain information of which prefix has been leased to whom.

The system 300 can further include the data store 204 as discussed previously in FIG. 2. It is to be appreciated that the data store 204 can store information such as, but not limited to, BGP prefix information for at least one host and at least one client. In other words, the BGP prefix component 302 can identify and store BGP prefixes in the data store 204 which can be leveraged for predictions provided by the prefix history predictor.

Figure 4:
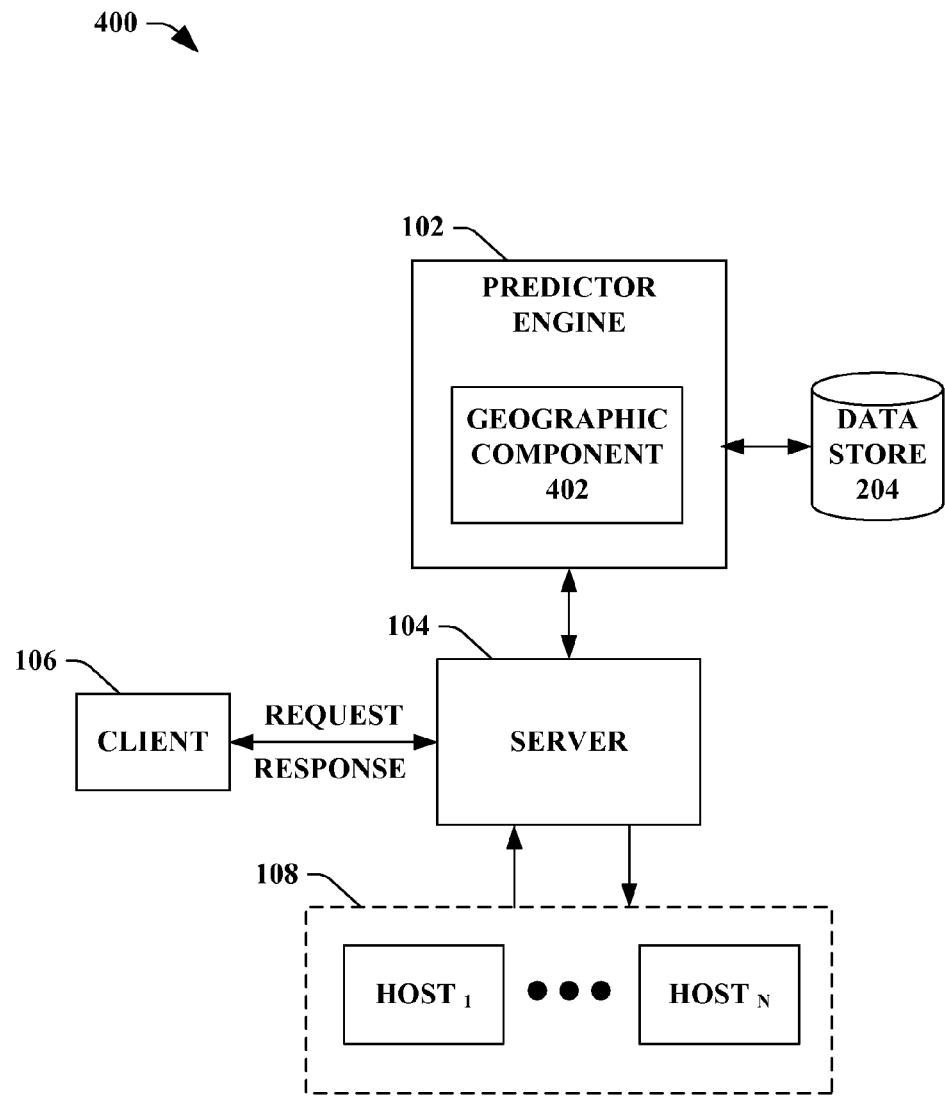
FIG. 4 illustrates a block diagram of an exemplary system that facilitates creating a list of potential peer-to-peer connection hosts for a client based upon a geography predictor.

FIG. 4 illustrates a system 400 that facilitates creating a list of potential peer-to-peer connection hosts for a client based upon a geography predictor. The system 400 can include the predictor engine 102 that can estimate NPQ between the client 106 and at least one host 108 utilizing at least one predictor, wherein such estimation can reduce the amount of probing in order to establish a peer-to-peer connection. By reducing the amount of probing, both network overhead and duration of time for connectivity is reduced.

The predictor engine 102 can implement a geographic component 202 that enables an estimation of quality for a matched host with the client 106. In particular, the geographic component 402 can utilize the geography predictor that identifies the geographic distance between the client 106 and at least one host 108 to estimate the RTT and/or NPQ therewith. It is to be appreciated that in addition to RTT, a one-way delay can be utilized by the claimed subject matter. The geographic component 402 can utilize the data store 204 to leverage information for mapping an IP address to geographic coordinates to determine locations. In particular, a source and destination IP address can be converted in a probe to the geographic coordinates, and apply an algorithm (a great circle distance algorithm, etc.) to calculate distance. It is to be appreciated that a strong correlation between a geographic distance and a minimum RTT exists and the geography predictor can optimize probing for peer-to-peer networking. Furthermore, it is to be appreciated and understood that the geographic component 402 can be a component incorporated into the predictor engine 102, incorporated into the client 106, incorporated into the server 104, incorporated into at least one host 108, a stand-alone component, and/or any suitable combination thereof.

The system 400 can further include the data store 204 as discussed previously in FIG. 2. It is to be appreciated that the data store 204 can store information such as, but not limited to, IP address mappings, geographic coordinates based on IP addresses, geographic locations for at least one host, geographic locations for at least one client, etc. In other words, the geographic component 402 can identify and store geographic data and/or locations in the data store 204 which can be leveraged for predictions provided by the geography predictor.

Figure 5:
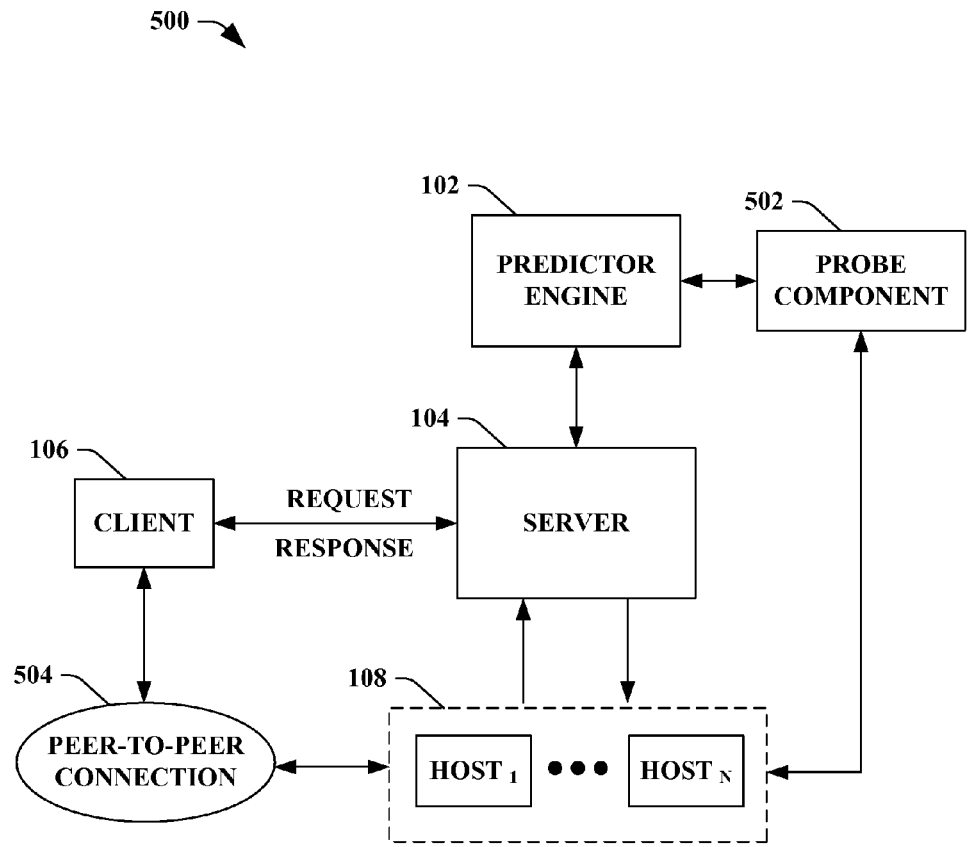
FIG. 5 illustrates a block diagram of exemplary system that facilitates probing between hosts and clients (and vice versa) to identify potential peer-to-peer connections with a high network path quality (NPQ).

FIG. 5 illustrates a system 500 that facilitates probing between hosts and clients (and vice versa) to identify potential peer-to-peer connections with a high network path quality (NPQ). The system 500 can efficiently initiate probes between matched pairs of clients and hosts based upon predictors that estimate NPQ and/or RTT between such matched pairs. The client 106 can communicate a request to the server 104, wherein the server can identify potential hosts 108 that match such request. The predictor engine 102 can utilize at least one predictor in order to reduce the number of identified potential hosts 108 by estimating whether the NPQ and/or the RTT are sufficient. The predictor engine 102 can utilize an IP history predictor, a prefix history predictor, and/or a geography predictor.

Once the list or number of potential hosts 108 are reduced, a probe component 502 can further employ a probing between the matched pairs (e.g., a pair includes at least one host and at least one client). As discussed, probing can be a packet pair test from the client to a host and/or a packet pair test from the host to the client in connection with a client and at least one host. It is to be appreciated that the probing can be between a host and a client and a client and a host. Based upon the probing, the client 106 can select and/or identify a suitable matched host from the reduced potential hosts to initiate a peer-to-peer connection 504. In one particular example, the peer-to-peer connection 504 can be an online gaming session and/or any suitable data communication utilizing at least two or more computing devices.

For instance, if a client and host have a good NPQ based upon a predictor, a limited probing can be implemented to initiate a reduced list of potential hosts that match a client request. If a client and a host have a bad NPQ based upon a predictor, such bad NPQ between the pair can be discarded and not probed (e.g., removed and/or eliminated from the list of potential matches). If no prediction can be provided by any of the predictors, standard probing can be employed.

Figure 6:
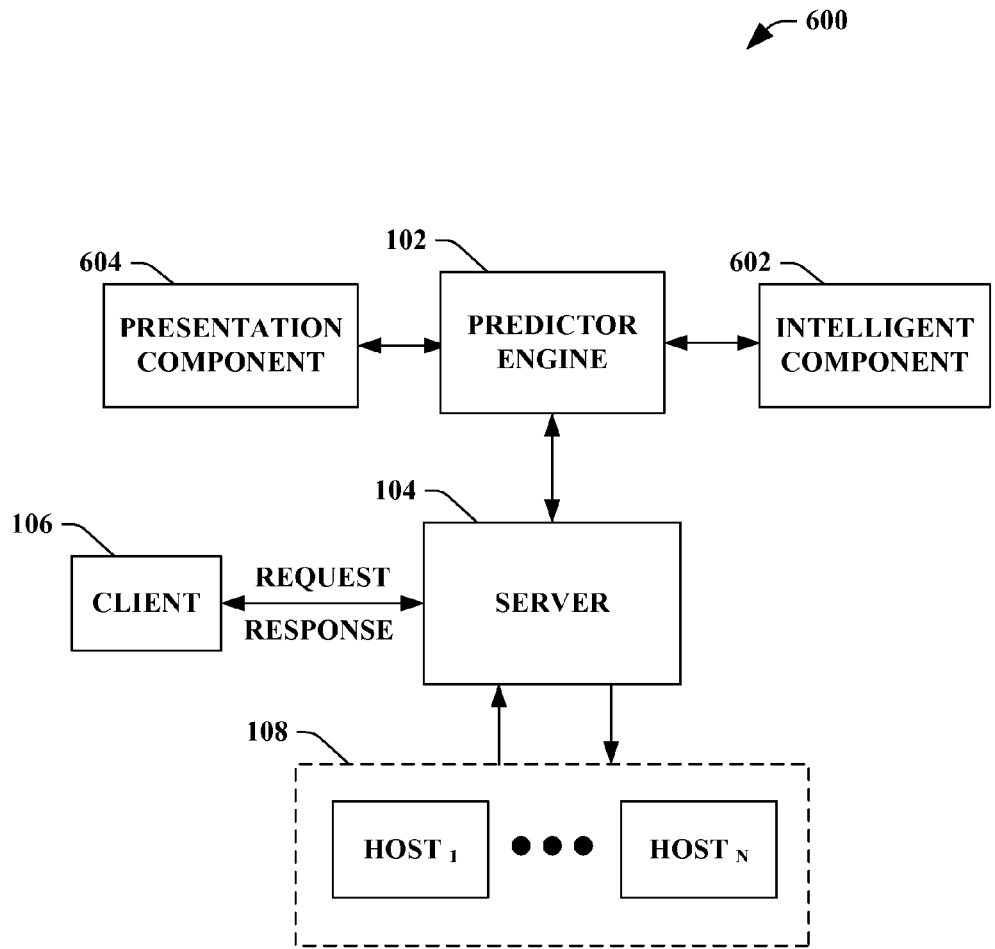
FIG. 6 illustrates a block diagram of an exemplary system that facilitates utilizing inference techniques in accordance with the subject innovation.

FIG. 6 illustrates a system 600 that employs intelligence to facilitate connectivity in a peer-to-peer network by optimizing location of matches between hosts and clients. The system 600 can include the predictor engine 102, the server 104, the client 106, and a plurality of hosts 108 that provide a portion of a match to a request from the client 106. It is to be appreciated that the predictor engine 102, the server 104, the client 106, and the plurality of hosts 108 can be substantially similar to respective engines, components, servers, clients, and hosts described in previous figures. The system 600 further includes an intelligent component 602. The intelligent component 602 can be utilized by the predictor engine 102 to facilitate employing at least one predictor such as an IP history predictor, a prefix history predictor, or a geography predictor. For example, the intelligent component 602 can infer NPQ calculations, NPQ estimations, time duration limits related to the IP history predictor, accuracy of probed IP addresses, IP prefix pair information, border gateway protocol (BGP) prefix assignments, information related to the prefix history predictor, geographic data, geographic location, information related to the geography predictor, user settings, security preferences, username, passwords, profile data, etc.

The intelligent component 602 can employ value of information (VOI) computation in order to identify suggestions and/or inferred content for determination of host and/or client probing. For instance, by utilizing VOI computation, the most ideal and/or appropriate hosts and/or clients can be identified for peer-to-peer connectivity. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, and attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The predictor engine 102 can further utilize a presentation component 604 that provides various types of user interfaces to facilitate interaction between a user and any component coupled to the predictor engine 102. As depicted, the presentation component 604 is a separate entity that can be utilized with the predictor engine 102. However, it is to be appreciated that the presentation component 604 and/or similar view components can be incorporated into the predictor engine 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the predictor engine 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
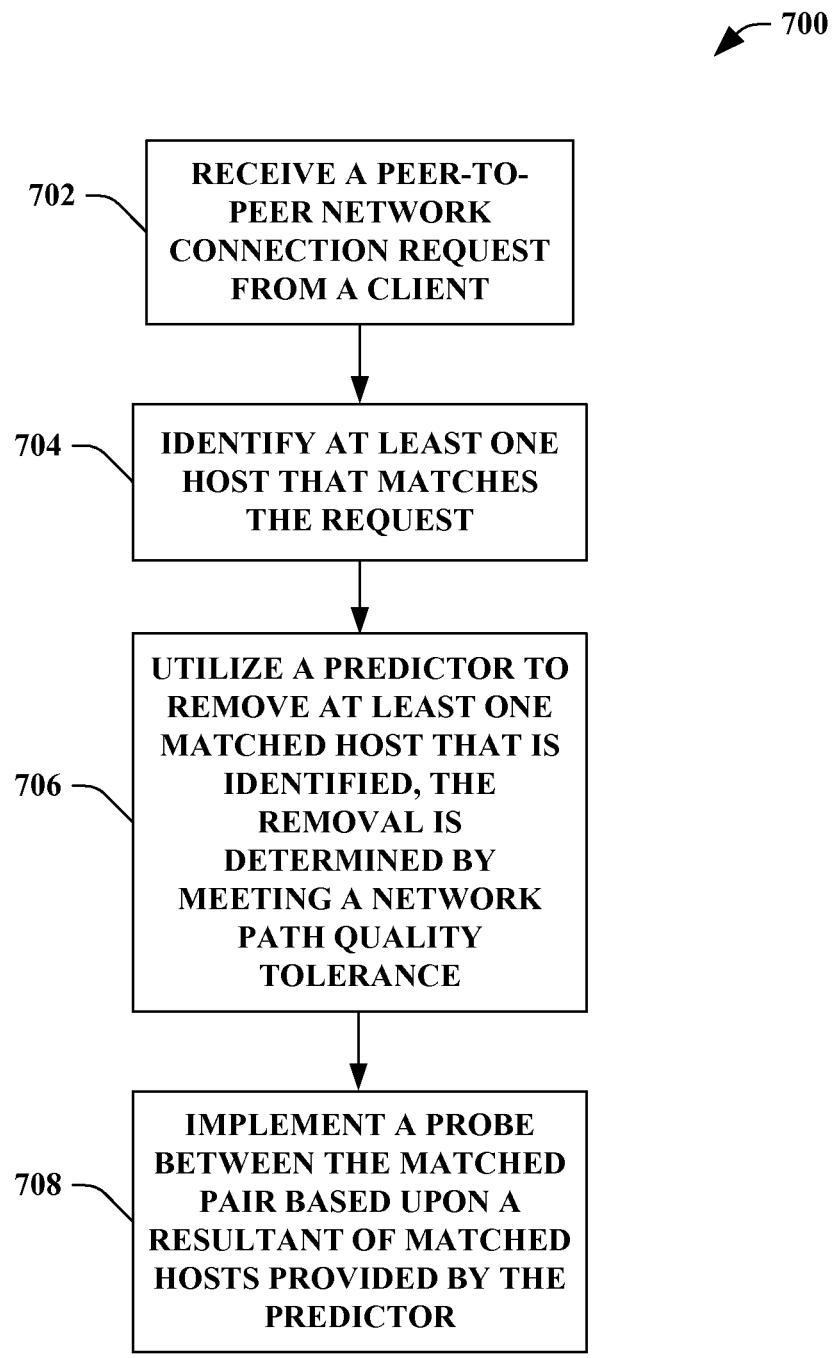
FIG. 7 illustrates an exemplary methodology for identifying a host for a client request to initiate a peer-to-peer connection.
Figure 8:
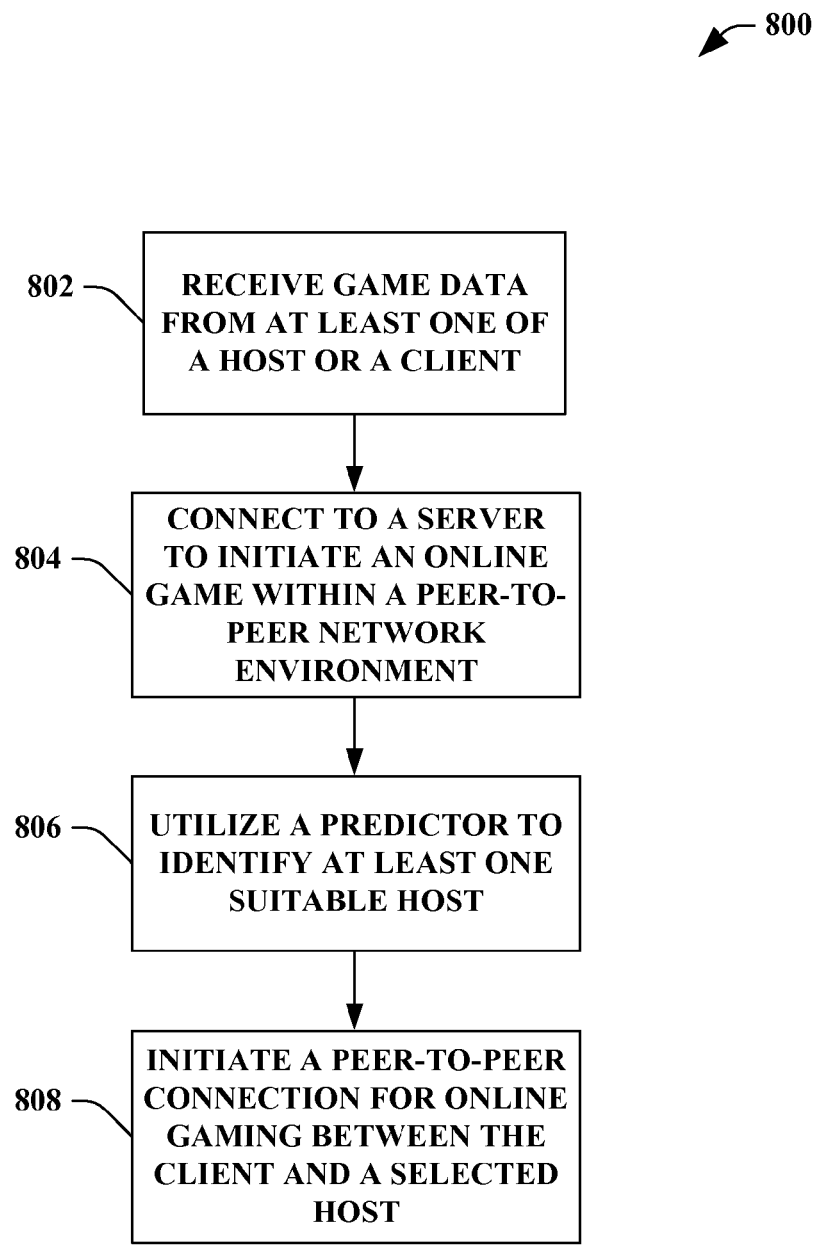
FIG. 8 illustrates an exemplary methodology that facilitates probing between hosts and clients (and vice versa) to identify potential peer-to-peer connections with a high network path quality (NPQ).

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates identifying a host for a client request to initiate a peer-to-peer connection. At reference numeral 702, a peer-to-peer network connection request can be received from a client. The client can transmit a request that include a portion of networking data such as, but not limited to, definitions of connectivity criteria, type of connectivity, peer-to-peer information related to an online game or a type of online game, online gaming data, etc. At reference numeral 704, at least one host that matches the request can be identified. For example, a client submitting a request to connect for an online gaming session for a game can be matched with a host that is serving such game. It is to be appreciated that the request and matching between the client and a host can be for any suitable peer-to-peer networking. Moreover, it is to be appreciated that there can be any suitable number of host matches for a client.

At reference numeral 706, a predictor to remove at least one matched host that is identified can be utilized, wherein the removal is determined by meeting a network path quality (NPQ) tolerance. The predictor can be, for instance, at least one of an IP history predictor (e.g., utilizing previous probes between matched IP addresses for NPQ estimation), a prefix history predictor (e.g., utilizing previous probes between IP prefix pairs belonging to a substantially similar BGP prefix to estimate NPQ), and/or a geography predictor (e.g., estimating the geographic distance between a host and a client to indicate NPQ). In general, the predictor can estimate a network path quality (NPQ) between a client and a host in which such estimation can be analyzed in order to identify if such NPQ is within a tolerance. For example, the NPQ tolerance can be pre-defined, user-defined, and/or automatically and dynamically generated based on real-time measurements (e.g., latency, bandwidth, round-trip delay time (RTT), etc.). At reference numeral 708, a probe between the matched pair can be implemented based upon a resultant of matched hosts provided by the predictor. It is to be appreciated that a probe or probing can be performing a packet pair test from the client to a host and a packet pair test from the host to the client in connection with a client and at least one host. It is to be further appreciated and understood that the packet pair test used in probing can be any suitable positive integer, wherein a packet pair can measure bottleneck link capacity.

FIG. 8 illustrates a method 800 for probing between hosts and clients (and vice versa) to identify potential peer-to-peer connections with a high network path quality (NPQ). At reference numeral 802, a portion of game data can be received from at least one of a host or a client. The game data can relate to any suitable video game that can be played in an online environment, and in particular, a peer-to-peer networking environment. For example, the game data can be associated with a game console, a computer, a portable gaming device, a computing device, a handheld, a PDA, a laptop, mobile communication device, a smartphone, etc.

At reference numeral 804, an online game can be initiated based upon a connection to a server, wherein the online game is within a peer-to-peer network environment. It is to be appreciated that connection to a server can be verified based upon a username, password, etc. For example, a particular online game can require a log in to a verified server for a gaming platform (e.g., game console, portable gaming device, computing device, etc.) as well as a log in to a server for the particular online game. In another example, a server for a gaming platform can be accessed, in which such log in credentials can be re-applied to log into a server related to a particular online game.

At reference numeral 806, a predictor to identify at least one suitable host can be utilized. It is to be appreciated that a predictor can be any suitable technique to reduce a listing of potential matches of hosts for clients (based on communicated requests), wherein such predictor estimates RTT and/or NPQ between matched pairs. For instance, the predictor can be at least one of an IP history predictor, a prefix history predictor, and/or a geography predictor. At reference numeral 808, a peer-to-peer connection for online gaming between the client and a selected host can be initiated. For example, the client can select a host for connectivity from the reduced list of matched hosts, wherein the reducing is based upon the predictors.

Figure 9:
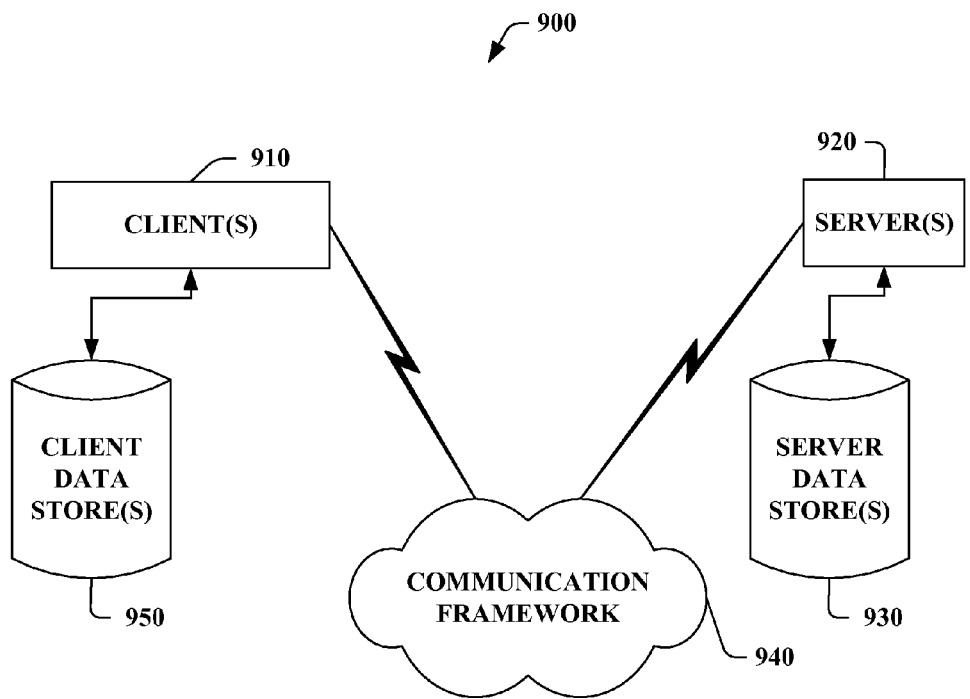
FIG. 9 illustrates an exemplary networking environment, wherein the novel aspects of the claimed subject matter can be employed.
Figure 10:
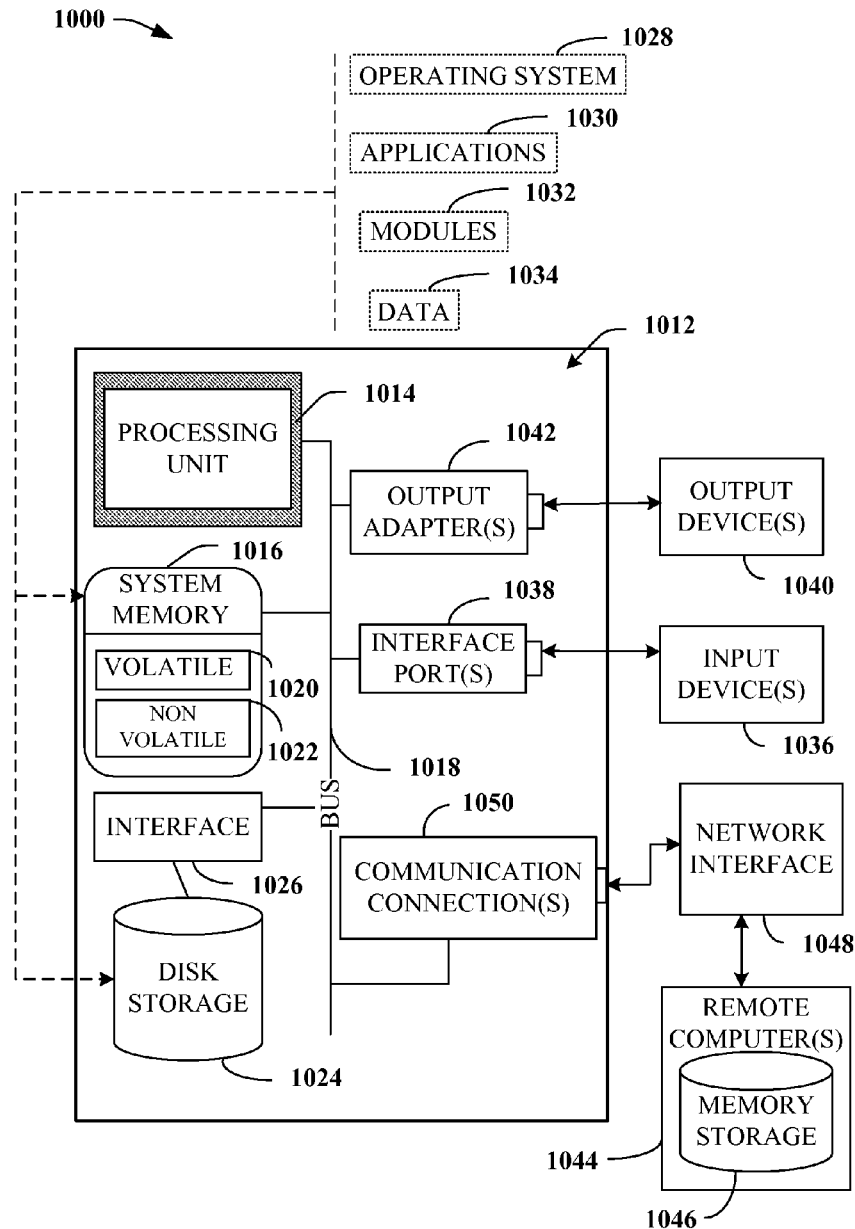
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a predictor engine that can employ a predictor to facilitate identification of optimal matches between a client and a host for peer-to-peer networking, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates connectivity within a peer-to-peer networking environment, comprising:
   one or more processors;
   one or more computer-readable storage devices with instructions stored thereon that, when executed by the one or more processors, cause the one or more processors to perform operations comprising:
   receiving, from a client, a request to connect with a host for peer-to-peer networking, the request comprising a game account associated with the client and defining connectivity criteria with the host;
   verifying the client based in part on the game account and generating a list that includes a plurality of hosts that match the request from the client;
   determining an estimation of network path quality (NPQ) by a predictor, the predictor is at least one of an Internet Protocol (IP) history predictor, a prefix history predictor, or a geography predictor;
   reducing the list by removing at least one matched host from the list based upon the estimation of the NPQ by the predictor;
   determining, based on the estimation of the NPQ by the predictor, a probing technique to employ for probing for the client and at least one other matched host in the list, wherein the probing technique comprises at least one probing operation between the client and the at least one other matched host from the reduced list, wherein the probing technique is at least one of the following: standard probing and limited probing; and
   implementing a probing for the client and the at least one other matched host from the reduced list based on the determined probing technique.

2. The system of claim 1, further comprising instructions executable by the one or more processors to utilize the IP history predictor to perform the reduction of the list based upon an estimate of at least one of a round-trip delay time (RTT) or the NPQ, wherein the estimation is based upon a previous probe between a matched pair of the client and at least one host in which the previous probe is employed as the estimation limited by a duration of time.

3. The system of claim 1, further comprising instructions executable by the one or more processors to utilize the prefix history predictor to perform the reduction of the list based upon an estimate of at least one of a round-trip delay time (RTT) or the NPQ, the estimation is based upon a BGP prefix associated with a previous probe between a matched pair of the client and at least one host in which the previous probe is employed as the estimation limited by a duration of time.

4. The system of claim 1, further comprising instructions executable by the one or more processors to utilize the geography predictor to perform the reduction of the list based upon an estimate of at least one of a round-trip delay time (RTT) or the NPQ, the estimation is based upon a geographic location of a matched host in comparison to the client ascertained by a mapping of an IP address to a geographic coordinate.

5. The system of claim 1, wherein the predictor is the prefix history predictor if a prediction is not ascertained by the IP history predictor.

6. The system of claim 1, wherein the probing is a packet pair test from the client to the at least one other matched host and a packet pair test from the at least one other matched host to the client.

7. The system of claim 6, wherein the packet pair measures bottleneck link capacity.

8. The system of claim 1, wherein the determined probing technique is determined to be at least one of the following:
   a limited probing based upon the estimation of the NPQ between the client and at least one other matched host as a good NPQ; and
   a standard probing based upon when the determining fails to provide the estimation of the NPQ, wherein the limited probing being a lesser probing in comparison to the standard probing.

9. The system of claim 1, wherein the connectivity criteria relates to services related to an online game.

10. The system of claim 1, wherein the estimation by the predictor is an estimated NPQ for the client and the at least one other matched host and the reduction is performed by removing a matched pair from the list that is outside an NPQ tolerance.

11. The system of claim 10, wherein the NPQ tolerance is defined by at least one of a server, the client, or a matched host.

12. The system of claim 10, wherein the NPQ tolerance is dynamically generated based on a real-time measurement.

13. The system of claim 12, wherein the real-time measurement is at least one of a latency, a bandwidth, or a round-trip delay time (RTT).

14. A method that facilitates reducing network overhead in connection with an online environment, comprising:
   receiving, at one or more computing devices including a processor and memory device, online gaming data from a client describing at least a type of game to initiate an online game within a peer-to-peer network environment, the online gaming data further comprising an online gaming account associated with the client and further defining connectivity criteria comprising a network path quality tolerance;

verifying, by the one or more computing devices, the online gaming account associated with the client;

generating, by the one or more computing devices, a list that includes a plurality of hosts that match a portion of the online gaming data;

determining, by the one or more computing devices, an estimation of network path quality (NPQ) by a predictor;

reducing, by the one or more computing devices, the list by removing at least one matched host from the list based upon the estimation of the NPQ by the predictor;

determining, based on the estimation of the NPQ by the predictor, a probing technique to employ for probing for the client and at least one other matched host, wherein the probing technique comprises at least one probing operation between the client and the at least one other matched host from the reduced list, wherein the probing technique is at least one of the following: standard probing and limited probing; and implementing, by the one or more computing devices, a probe between at least one of the client and the at least one other matched host from the reduced list based on the determined the probing technique.

15. The method of claim 14, wherein the predictor is at least an IP history predictor, a prefix history predictor, or a geography predictor.

16. The method of claim 14, wherein the probing technique is determined to be:
   a limited probing based upon estimation of the NPQ between the client and at least one host as a good NPQ; and
   a standard probing based upon the determining of the estimation failing to make a determination of the estimate,
   wherein the limited probing being a lesser probing in comparison to the standard probing.

17. A computer-readable storage device storing instructions that, when executed by one or more computer processors, cause the one or more computer processors to perform operations that facilitate reducing network overhead in connection with an online environment, the operations comprising:
   receiving a client request to connect with a host for peer-to-peer networking from a client, the client request further comprising an online gaming account associated with the client and defining connectivity criteria with the host;
   verifying the online gaming account;
   generating a list that includes a plurality of hosts that match the client request;
   determining an estimation of network path quality (NPQ) by a predictor, the estimation by the predictor being an estimate of a network path quality (NPQ) between the client and at least one host on the list;
   reducing the list by removing at least one matched host from the list based upon the estimate by the predictor;
   determining, based on the estimation of the NPQ by the predictor, a probing technique to employ for probing for the client and at least one other matched host, wherein the probing technique comprises at least one probing operation between the client and the at least one other matched host from the reduced list, wherein the probing technique is at least one of the following: standard probing and limited probing; and
   probing the client and the at least one other matched host on the reduced list based at least in part on the determined probing technique.

18. The computer-implemented system of claim 17, wherein the probing technique is determined to be:
   a limited probing based upon estimation of the NPQ between the client and at least one host as a good NPQ; and
   a standard probing based upon when the determining fails to provide the estimation of the NPQ,
   wherein the limited probing being a lesser probing in comparison to the standard probing.

* * * * *